US007424426B2

United States Patent
Furui et al.

(10) Patent No.: US 7,424,426 B2
(45) Date of Patent: Sep. 9, 2008

(54) NOISE ADAPTATION SYSTEM OF SPEECH MODEL, NOISE ADAPTATION METHOD, AND NOISE ADAPTATION PROGRAM FOR SPEECH RECOGNITION

(75) Inventors: Sadaoki Furui, Tokyo (JP); Zhipeng Zhang, Tokyo (JP); Tsutomu Horikoshi, Kamakura (JP); Toshiaki Sugimura, Yokohama (JP)

(73) Assignee: Sadaoki Furui and NTT DoCoMo, Inc., Tokyo (JP)

( * ) Notice: Subject to any disclaimer, the term of this patent is extended or adjusted under 35 U.S.C. 154(b) by 682 days.

(21) Appl. No.: 10/920,461

(22) Filed: Aug. 18, 2004

(65) Prior Publication Data

US 2005/0080623 A1 Apr. 14, 2005

(30) Foreign Application Priority Data

Sep. 12, 2003 (JP) ............................ 2003-321648

(51) Int. Cl.
*G10L 15/00* (2006.01)
(52) U.S. Cl. ...................................... 704/250; 704/251
(58) Field of Classification Search .................. 704/250, 704/251
See application file for complete search history.

(56) References Cited

U.S. PATENT DOCUMENTS

| | | | | |
|---|---|---|---|---|
| 5,983,180 | A * | 11/1999 | Robinson | 704/254 |
| 6,026,359 | A * | 2/2000 | Yamaguchi et al. | 704/256.4 |
| 6,266,636 | B1 * | 7/2001 | Kosaka et al. | 704/244 |
| 6,658,385 | B1 * | 12/2003 | Gong et al. | 704/244 |
| 6,668,243 | B1 * | 12/2003 | Odell | 704/243 |
| 2004/0230420 | A1 * | 11/2004 | Kadambe et al. | 704/205 |

FOREIGN PATENT DOCUMENTS

| | | |
|---|---|---|
| JP | 2000-298495 | 10/2000 |
| JP | 2002-14692 | 1/2002 |

(Continued)

OTHER PUBLICATIONS

"Online Baysian Tree-Structured Transformation of HMMs Model Selection with optimal model selection for speaker model adaptation" Wang et al. IEEE Sep. 2001.*

(Continued)

*Primary Examiner*—Daniel D Abebe
(74) *Attorney, Agent, or Firm*—Crowell & Moring LLP

(57) ABSTRACT

An object of the present invention is to facilitate dealing with noisy speech with varying SNR and save calculation costs by generating a speech model with a single-tree-structure and using the model for speech recognition.

Every piece of noise data stored in a noise database is used under every SNR condition to calculate the distance between all noise models with the SNR conditions and the noise-added speech is clustered. Based on the result of the clustering, a single-tree-structure model space into which the noise and SNR are integrated is generated (steps S1 to S5). At a noise extraction step (step S6), inputted noisy speech to be recognized is analyzed to extract a feature parameter string and the likelihoods of HMMs are compared one another to select an optimum model from the tree-structure noisy speech model space (step S7). Linear transformation is applied to the selected noisy speech model space so that the likelihood is maximized (step S8).

7 Claims, 5 Drawing Sheets

FOREIGN PATENT DOCUMENTS

JP        2002-91484        3/2002

OTHER PUBLICATIONS

S. Furui, "Cepstral Analysis Technique for Automatic Speaker Verification," IEEE Transactions on Acoustics, Speech, and Signal Processing, vol. ASSP-29, No. 2, pp. 254-272, Apr. 1981.

M.J.F. Gales et al., "Mean and variance adaptation within the MLLR framework," Computer Speech and Language, pp. 240-264, 1996.

S. Nakagawa, "Speech recognition with probabilistic model," Institute of Electronics, Information and Communication Engineers, 1988 (partial English translation provided).

Sugamura et al., "Speaker independent recognition of isolated words based on multiple reference templates in SPLIT system," Speech Committee document, S82-64, 1982 (partial English translation provided).

Z. Zhang et al., "Effects of tree-structure clustering in noise adaptation using piecewise linear transformation," 2002 Autumn Meeting of the Acoustical Society of Japan, pp. 29-30 (partial English translation provided).

Zhipeng Zhang et al., "A Tree Structured Clustering Method Integrating Noise and SNR for Piecewise Linear-Transformation-Based Noise Adaptation", IEEE International Conference on Acoustics, Speech, and Signal Processing, May 17, 2004, pp. 981-984, vol. 1, Montreal, Canada, XP-002297864.

Zhipeng Zhang et al., "Tree-Structured Noise Adapted HMM Modeling for Piecewise Linear-Transformation-Based Adaptation", EUROSPEECH, Sep. 1, 2003, pp. 669-672, Geneva, Switzerland, XP-002297865.

Zhipeng Zhang et al., Study on Tree-Structure Clustering in Noise Adaptation using Piecewise Linear Transformation, 2003 Spring Meeting of the Acoustical Society of Japan, Mar. 2003, pp. 37-38.

* cited by examiner

FIG. 6
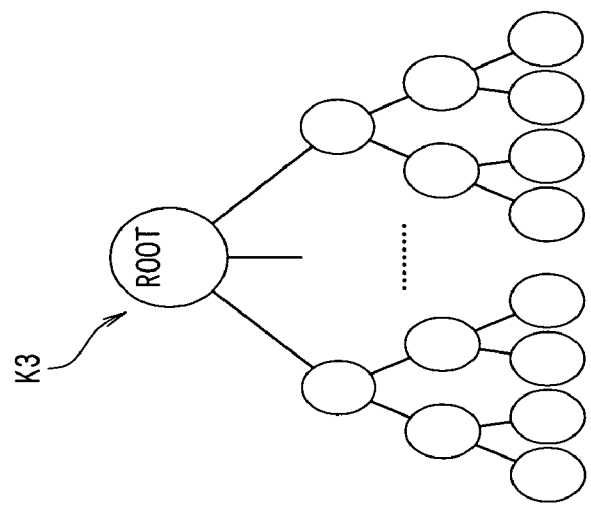
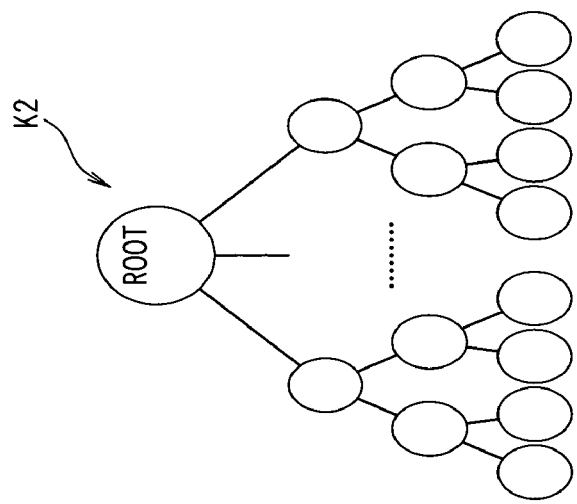
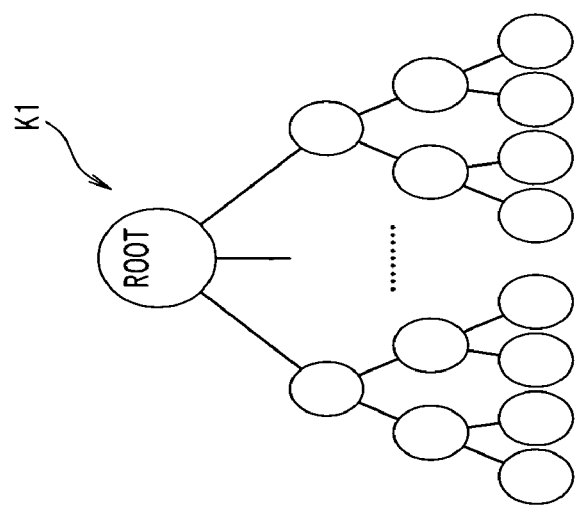

NOISE ADAPTATION SYSTEM OF SPEECH MODEL, NOISE ADAPTATION METHOD, AND NOISE ADAPTATION PROGRAM FOR SPEECH RECOGNITION

BACKGROUND OF THE INVENTION

1. Field of the Invention

The present invention relates to a noise adaptation system of speech model, a noise adaptation method, and a noise adaptation program. In particular, the present invention relates to a noise adaptation system of speech model, a noise adaptation method, and a noise adaptation program that use noisy speech to be recognized to adapt a clean speech model generated by modeling features of speech by means of a Hidden Markov Model (HMM) so that the recognition rate for the noisy environment can be improved.

2. Description of the Related Art

A tree-structure piecewise linear transformation approach is described in an article entitled "Effects of tree-structure clustering in noise adaptation using piecewise linear transformation" by Zhipeng Zhang et al. (Proceedings of 2002 Autumn Meeting of the Acoustical Society of Japan, pp. 29-30). According to the approach described in the article, noise is clustered, a tree-structure noisy speech model space is generated based on the result of the clustering, a speech feature parameter of input noisy speech to be recognized is extracted, an optimum model is selected from the tree-structure noisy speech model space, and linear transformation is applied to the selected model so as to increase the likelihood of the selected model, thereby improving the accuracy of input speech.

Another approach is described in an article entitled "Study on tree-structure clustering in noise adaptation using piecewise linear transformation" by Zhipeng Zhang et al. (2003 Spring Meeting of the Acoustical Society of Japan, pp. 37-38), in which noise characteristics are sequentially and hierarchically divided to generate a tree structure of a noise-added speech model. In this approach, noise-added speech is first clustered by signal-to-noise ratio (hereinafter abbreviated to SNR) and then a tree-structure model is provided for each SNR condition to generate a tree-structure noisy speech model space.

FIG. 6 shows an example of the tree-structure noisy speech model. In FIG. 6, a tree-structure noisy speech model is provided for each of three SNR conditions. In FIG. 6, a tree-structure model for SNR=5 dB is indicated by K1, a tree-structure model for SNR=10 dB is indicated by K2, and a tree-structure model for SNR=15 dB is indicated by K3. The top node (root) of each tree-structure model K1-K3 represents a clean speech model. Higher levels of each tree structure represent global features of noise characteristics and lower levels represent local features.

Described in Japanese Patent Laid-Open No. 2002-14692 (FIGS. 2 and 3 and Abstract, in particular) is a technology in which a large number of noise samples are clustered beforehand, acoustic models are generated on the basis of the samples, and noise selected through clustering is added to learning data, thereby enabling efficient learning with a small number of noise samples to achieve high recognition performance.

Japanese Patent Laid-Open No. 2002-91484 (Abstract, in particular) described a technology in which a language model is generated for each tree-structure cluster, which is used for speech recognition.

Japanese Patent Laid-Open No. 2000-298495 (Abstract and Claim 2, in particular) describes combining a number of tree structures to form a new tree structure.

In the approach in "Study on tree-structure clustering in noise adaptation using piecewise linear transformation" cited above, input noisy speech to be recognized is analyzed to extract a feature parameter string and an optimum model is selected from a tree-structure noisy speech model space. Linear transformation is applied to the selected optimum model to maximize the likelihood. Accordingly, this approach has a drawback that recognition involves a two-step search: an optimum model is first selected under each SNR condition and then the best model is selected from among all SNR models. Problems here are the difficulty of dealing with noisy speech with varying SNR and high costs of computing the conditions.

None of the technologies described in the above-sited documents can solve these problems.

An object of the present invention is to provide a noise adaptation system, a noise adaptation method, and a noise adaptation program for speech recognition that can readily deal with noisy speech with varying SNR and can minimize computation costs by generating a speech model with a single-tree-structure into which noise and SNR are integrated.

SUMMARY OF THE INVENTION

According to the first aspect of the present invention, there is provided a noise adaptation system of speech model for adapting a speech model for any noise to speech to be recognized in a noisy environment, the speech model being learned by using noise data stored in a noise database and clean speech data, the system comprising: a clustering means of clustering all noise data stored in the noise database; a speech model means generating means of generating a single-tree-structure noisy speech model space based on the result of the clustering performed by the clustering means; a parameter extracting means of extracting a speech feature parameter of input noisy speech to be recognized; a selecting means of selecting an optimum model from the tree-structure noisy speech model space generated by the speech model space generating means; and a linear transformation means of applying linear transformation to the model selected by the selecting means so that the model provides a further increased likelihood. The single-tree-structure noisy speech model space generated as described above allows noisy speech with varying SNR to be readily dealt with and the computation cost to be saved.

According to the second aspect of the present invention, there is provided the noise adaptation system of speech model according to the first aspect, wherein the clustering means generates the noise-added speech by adding the noise to the speech in accordance with a signal-to-noise ratio condition, subtracts the mean value of speech cepstral of the generated noise-added speech, generates a Gaussian distribution model of each of pieces of generated noise-added speech, and calculates the likelihood between the pieces of noise-added speech to generate a likelihood matrix to provide a clustering result. This allows noise-added speech to be clustered.

According to the third aspect of the present invention, there is provided the noise adaptation system according to first or second aspect, wherein the selecting means selects a model that provides the highest likelihood for the speech feature parameter extracted by the parameter extracting means. By selecting the model that provides the highest likelihood, the accuracy of speech recognition can be increased.

According to fourth aspect of the present invention, there is provided the noise adaptation system according to the third aspect, wherein the selecting means selects a model by searching the tree-structure noisy speech model space downward from the highest level to the lowest level. By searching the tree structure from the highest level to the lowest level, an optimum model can be selected.

According to fifth aspect of the present invention, there is provided the noise adaptation system according to one of the first to fourth aspects, wherein the linear transformation means performs the linear transformation on the basis of the model selected by the selecting means to increase the likelihood. By performing the linear transformation, the likelihood can be maximized.

According to the sixth aspect of the present invention, there is provided a noise adaptation method for adapting a speech model for any noise to speech to be recognized in a noisy environment, the speech model being learned by using noise data stored in a noise database and clean speech data, the method comprising: a clustering step of clustering all noise-added speech data stored in the noise database; a speech model space generating step of generating a single-tree-structure noisy speech model space based on the result of the clustering performed in the clustering step; a parameter extracting step of extracting a speech feature parameter of input noisy speech to be recognized; a selecting step of selecting an optimum model from the tree-structure noisy speech model space generated in the speech model space generating step; and a linear transformation step of applying linear transformation to the model selected in the selecting step so that the model provides a further increased likelihood. The single-tree-structure noisy speech model space allows noisy speech with varying SNR to be readily dealt with and the computation cost to be saved.

According to the seventh aspect of the present invention, there is provided a noise adaptation program for adapting a speech model for any noise to speech to be recognized in a noisy environment, the speech model being learned by using noise data stored in a noise database and clean speech data, the program comprising: a clustering step of clustering all noise-added speech data stored in the noise database; a speech model space generating step of generating a single-tree-structure noisy speech model space based on the result of the clustering performed in the clustering step; a parameter extracting step of extracting a speech feature parameter of input noisy speech to be recognized; a selecting step of selecting an optimum model from the tree-structure noisy speech model space generated in the speech model space generating step; and a linear transformation step of applying linear transformation to the model selected in the selecting step so that the model provides a further increased likelihood. The single-tree-structure noisy speech model space allows noisy speech with varying SNR to be readily dealt with and the computation cost to be saved.

In effect, according to the present invention, all pieces of noise data in a noise database (hereinafter abbreviated to DB) are used to cluster noise-added speech into a single-tree-structure based on every SNR condition. A noise-added speech space is partitioned in a tree structure according to SNRs and noise characteristics, and sound feature parameter strings of input noisy speech to be recognized are extracted. Then, an optimum model is selected from the tree-structure model space on the basis of the feature parameter string and liner transformation is applied to this model.

The single-tree-structure into which noise and SNR are integrated is generated to allow the most likely noise-added speech model to be learned. Thus, a high recognition accuracy can be achieved. Furthermore, the approach of the present invention does not require selecting an optimum model under each individual SNR condition. Instead, the approach of the present invention involves just a one-step search through which the best model among all SNR models is selected. Therefore, noisy speech with varying SNR can be readily dealt with and the computation costs can be saved.

According to the first, sixth and seventh aspects of the present invention, the present invention has advantages that noisy speech with varying SNR can be readily dealt with and the computation costs can be saved by using a single-tree-structure noisy speech model space.

According to the second aspect of the present invention, the present invention has an advantage that noise-added speech can be clustered by adding noise to speech according to signal-to-noise conditions, subtracting the mean value of speech cepstral of each of the pieces of generated noise-added speech, generating a Gaussian distribution model of each of the pieces of noise-added speech, and calculating the likelihood between the pieces of noise-added speech to generate a likelihood matrix.

According to the third aspect of the present invention, the present invention has an advantage that an improved accuracy of speech recognition can be achieved by selecting a model that provides the highest likelihood for an extracted speech feature parameter.

According to the fourth aspect of the present invention, the present invention has an advantage that an optimum model can be selected by searching the tree-structure noisy speech model space from the highest level to the lowest level for an optimum model.

According to the fifth aspect of the present invention, the present invention has an advantage that the likelihood can be maximized by performing linear transformation on the basis of the selected model so as to increase the likelihood.

BRIEF DESCRIPTION OF THE DRAWINGS

FIG. 6 is a conceptual diagram showing a process for selecting an optimum model in a tree-structure noisy speech model space used in a conventional noise adaptation system of speech model.

DETAILED DESCRIPTION OF THE PREFERRED EMBODIMENTS

Figure 1:
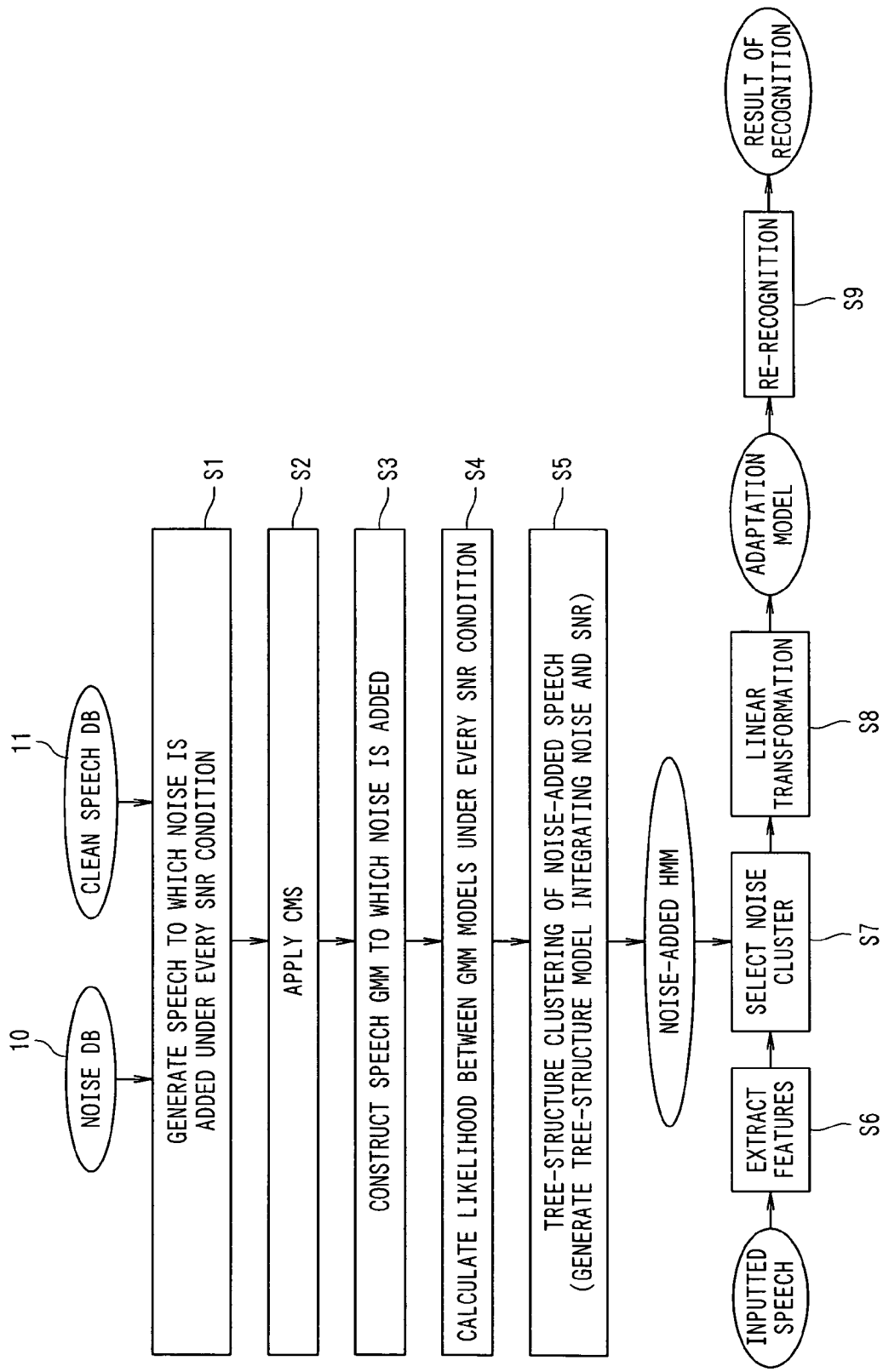
FIG. 1 is a flowchart of a process performed by a noise adaptation system of speech model according to the present invention.

Embodiments of the present invention will be described with reference to the accompanying drawings. Like elements are labeled with like reference numerals throughout the drawings referenced in the following description.

According to the present invention, a noisy speech model space is generated as a tree structure by using SNR and sound quality. To generate the noisy speech model space, a noise database is used to add noise to clean speech according to every SNR condition to produce noise-added speech. Then, noise characteristics are represented as a single-tree-structure to provide a model, in which higher levels of the tree structure represent global features of noise characteristics and lower levels represent local features. An optimum piecewise space of noise can be selected by following the tree structure downward from the root in top-down fashion to select an optimum model.

Because noise-added speech is consistently used both in clustering and model learning processes, the noise-added speech model that provides the highest likelihood can be learned and an improved accuracy of recognition can be achieved.

(Configuration of the Present System)

Figure 2:
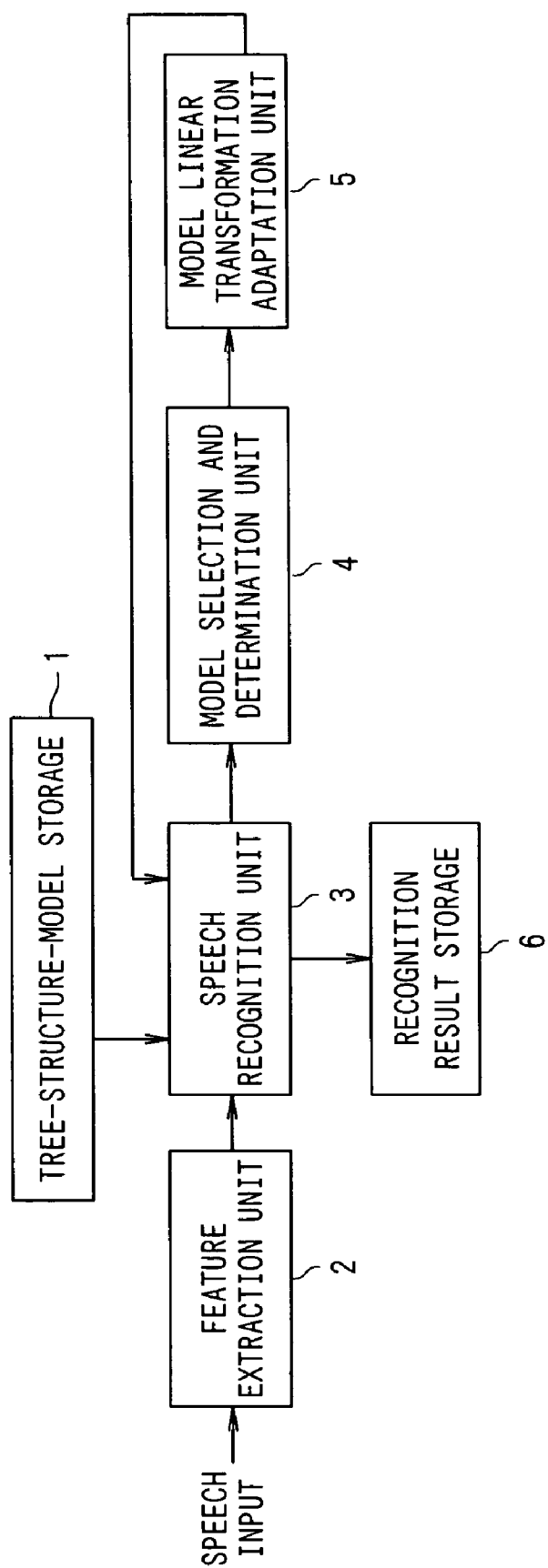
FIG. 2 is a block diagram showing a configuration of a noise adaptation system of speech model according to one embodiment of the present invention.

A configuration for implementing the above-described process will be described with reference to FIG. 2, which is a block diagram showing one embodiment of the noise adaptation system according to the present invention. As shown in FIG. 2, the noise adaptation system according to the present embodiment includes a tree-structure-model storage 1, a feature extraction unit 2, a speech recognition unit 3, a model selection and determination unit 4, a model linear transformation adaptation unit 5, and a recognition result storage 6. The present system is realized as terminal apparatus, mobile terminal, server computer, personal computer, and other equipment comprising above units and storages.

The tree-structure-model storage 1 stores a noise-added speech HMM which has been built as a single-tree-structure based on a result of clustering of noise-added speech.

The feature extraction unit 2 analyzes speech data inputted to it and transforms it into feature vectors.

The speech recognition unit 3 applies a Viterbi algorithm to the time series feature vector time transformed from the input speech data to obtain a model sequence that provides the highest likelihood function.

The model selection and determination unit 4 selects an optimum model that provides an optimum model that provides the highest likelihood from among models stored in the tree-structure-model storage 1.

The model linear transformation adaptation unit 5 applies linear transformation to the model selected by the model selection and determination unit 4 so as to maximize its likelihood.

The recognition result storage 6 stores speech recognition results.

(Operation of the System)

Figure 3:
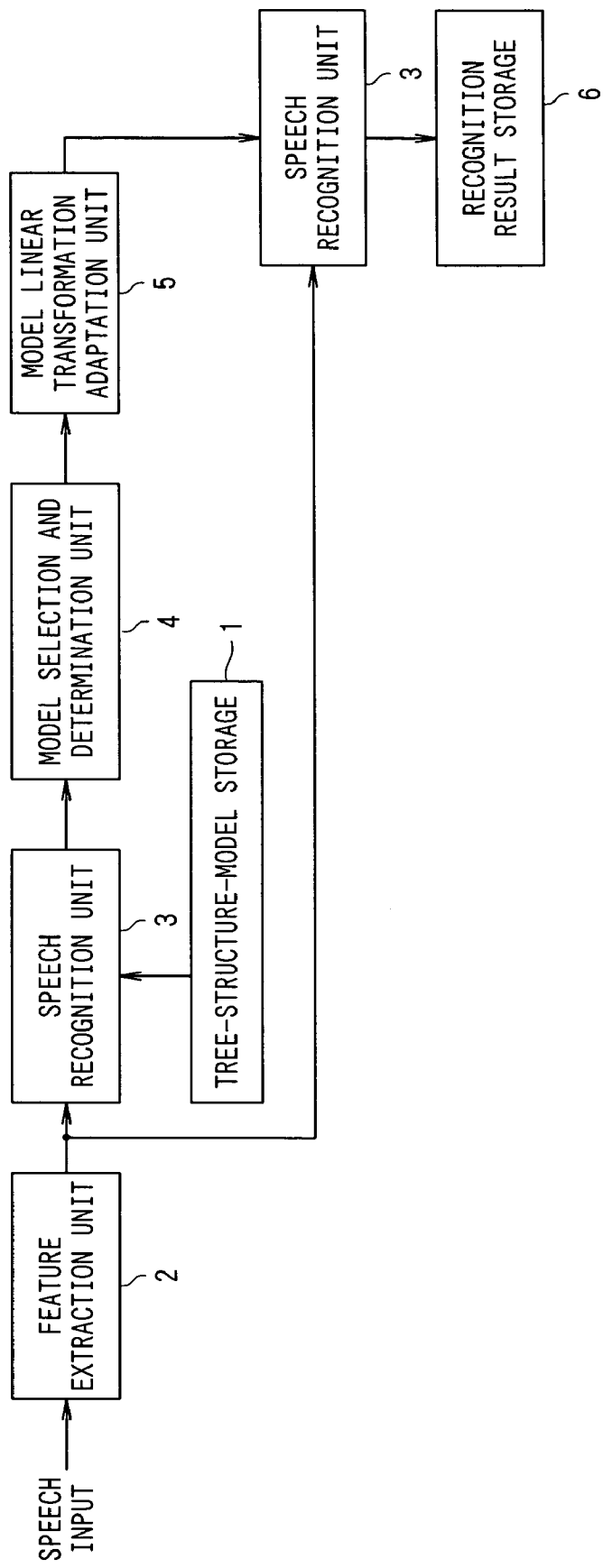
FIG. 3 is a functional block diagram in which components shown in FIG. 2 are rearranged in accordance with operation flow in the system.

Operation of the system having the structure described above will be described with reference to FIGS. 1 and 3. FIG. 3 is a functional block diagram in which the components 1-6 shown in FIG. 2 are rearranged according to the flow of operation in the system. FIG. 1 is a flowchart of a process performed by the system.

The process for performing speech recognition in the system follows steps S1 to S9 as described below.

Step S1 (the step of generating noise-added speech): Every piece of noise data stored in a noise database is used to add noise to clean speech according to every SNR condition to generate noise-added speech.

Step S2 (the step of subtracting the mean of noise-added speech): CMS (Cepstral Mean Subtraction) is applied to noise-added speech generated at step S1. CMS is a technique for subtracting the mean of speech cepstral. That is, the mean cepstral of value of all frames of speech data in a certain interval is calculated and the mean value is subtracted from the vector of each frame. The cepstral is the Fourier transform of the logarithm of a power spectrum obtained by Fourier transform. The CMS is described in a document entitled "Furui: Cepstral Analysis Technique For Automatic Speaker Verification, IEEE Transaction on Acoustical Speech and Signal Processing, Vol. ASSP-29, pp. 254-272, 1981."

Step S3 (the step of generating a noise-added speech model): A Gaussian mixture model (GMM) of each noise-added speech is generated by means of the Baum-Welch algorithm. Baum-Welch algorithm is a repetitive approach to getting closer to an optimum value, starting from an appropriate initial value. The Baum-Welch algorithm is described in a document entitled "Speech recognition with probabilistic model" by Seiichi Nakagawa (Institute of Electronics, Information and Communication Engineers, 1988).

Step S4 (the step of clustering noise-added speech): The GMM is used to calculate the likelihoods between pieces of noise-added speech to generate a likelihood matrix. A SPLIT method based on the likelihood matrix is used to serially cluster the noise-added speech. In the SPLIT method, clusters that provide the largest distortion are split sequentially. Consequently, any number of clusters can be generated. The result of clustering can be obtained fully automatically simply by giving the number of clusters. The SPLIT method is described in a Speech Committee document by Sugamura et al. (S82-64, 1982).

Step S5 (application to piecewise linear transformation adaptation): A tree-structure clustering result of the noise-added speech is provided by the step S4. The clustering result is stored in the tree-structure model storage 1. The clustering result is a single-tree-structure model in which noise and SNR are integrated. Also, the clustering result represents features in tree-structure form; global features of the noise-added speech are represented at a higher level of the tree structure and local features of the speech are represented at a lower level.

The clustering result stored in the tree-structure-model storage 1 is applied to piecewise linear transformation. The piecewise linear transformation is described in the above-cited article "Effects of tree-structure clustering in noise adaptation using piecewise linear transformation" by Zhipeng Zhang et al. In particular, steps S6 to S9 described below are performed.

Step S6 (the step of extracting feature quantities): The feature extraction unit 2 extracts feature quantities from noise-added speech data to be recognized. In the feature quantity extraction, LPC (Linear Prediction Coding) analysis is applied to each frame of inputted speech data to obtain time series feature parameter vectors such as a cepstral or Δ cepstral, as a feature parameter sequence.

Figure 4:
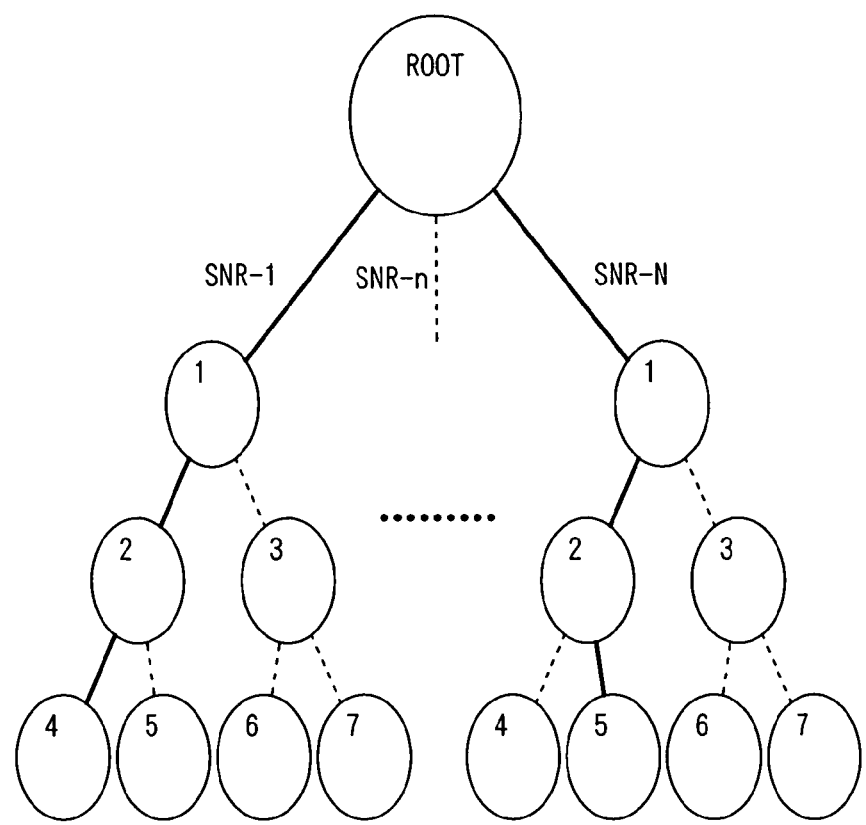
FIG. 4 is a conceptual diagram showing a process for selecting an optimum model in a tree-structure noisy speech model space in the system.

Step S7 (selecting an optimum model): The step of selecting an optimum model will be described with reference to FIG. 4. The node (root) at the top of FIG. 4 represents a clean speech model. Under the root, there are N models, SNR-1 to SNR-N. The N models SNR-1 to SNR-N represent models learned from speech generated by adding all types of noise under all SNR conditions.

Child nodes below them represent models learned from speech data generated by adding some selected types of noise depending on the clustering result. At the bottom of the tree structure are models learned from speech that are generated by adding only a certain single type of noise. Thus, global noise characteristics are represented at the higher level of the tree structure and local noise characteristics are represented at the lower level.

Unlike the approach in the above-cited article "Study on tree-structure clustering in noise adaptation using piecewise linear transformation" by Zhipeng Zhang et al. (see FIG. 6), the approach of the present invention does not require selecting an optimum model under each individual SNR condition. Instead, it requires only one-step search in which the best model among all SNR models is selected.

Returning to FIG. 1, to perform recognition, the likelihood of a given clean model at root is first calculated by using the feature parameter sequence obtained at step S4. This is performed by the speech recognition unit 3 shown in FIG. 1.

Then, the speech recognition unit 3 uses the models below the root to calculate the likelihoods. The likelihood values thus calculated are used by the model selection and determination unit 4 to select an optimum model. In particular, this is achieved by following the following procedure. Models providing likelihoods higher than that of the clean model at root are reserved. Then the models at the child nodes below them are used to calculate the likelihoods under these SNR conditions. The likelihoods of two child node models are compared with that of the parent node. If a child node model provides the highest likelihood, the likelihoods of the child node models below that node are calculated. On the other hand, if the likelihood of the parent node is higher than those of the child node model, then no further calculation is performed and the parent node is determined as an optimum node.

In FIG. 4, the search paths are represented by solid lines. The calculation can be repeated to find an optimum space. Furthermore, the likelihood of the highest-likelihood models under different SNR conditions are compared one another to determine the model providing the highest likelihood among them is selected as the optimum model in the entire noisy speech space. In the example shown in FIG. 4, the fourth node provides the highest likelihood under condition SNR-1. Under SNR-N condition in FIG. 4, the fifth node provides the highest likelihood. The likelihoods of the highest-likelihood models under different SNR conditions are compared with one another to select the model that provides the highest likelihood among the highest-likelihood nodes.

Step S8 (linear regression): The model linear transformation adaptation unit 5 applies Maximum Likelihood Linear Regression (hereinafter abbreviated to MLLR) to the selected model so as to provide a further improved likelihood. The MLLR is described in a document entitled "Mean and variance adaptation within the MLLR framework" (M. J. F Gales et al., Computer Speech and Language, pp. 249-264, 1996). In particular, a phoneme sequence resulting from recognition is used to estimate a linear transformation matrix on the basis of an maximum likelihood criterion and the mean value and variances of HMM Gaussian distribution are adapted by linear transformation (linear regression).

Step S9 (re-recognition): When outputting the result of speech recognition, the speech recognition unit 3 uses the model obtained at step S8 to perform re-recognition and the re-recognition result is stored in the recognition result storage 6.

In a noise adaptation system of the present invention, as has been described, all pieces of noise data in a noise database are used to add noise to speech under every SNR condition and learn a noise-added speech model. The distance between all noise models under the SNR conditions are calculated and the noise-added speech is clustered. Based on the result of the noise-added speech clustering, a speech model having a tree structure is generated. Thus, a tree-structure model into which noise and SNR are integrated can be provided and a tree-structure noisy speech model space is generated. In the feature extraction step, an input noisy speech to be recognized is analyzed to extract a feature parameter sequence and the likelihoods of HMMs are compared with one another to select an optimum model from the tree-structure noisy speech model space. Linear transformation is applied to the model selected from the noisy speech model space so as to provide a further improved likelihood.

In summary, according to the present invention, every piece of noise-added speech data stored in a noise database is used to add noise to clean speech under every SNR condition to generate noise-added speech (step S1 in FIG. 1). The noise-added speech is clustered to form a single-tree-structure noise-added speech model space. In the noise-added speech model space, each piece of noise belonging to each tree-structure node is added to the clean speech to generate a noise-added speech model (step S3 in FIG. 1). The likelihoods are calculated in the noise-added-speech tree structure model space (step S4 in FIG. 1) and the tree structure is followed downward from the top to select an optimum model (step S7 in FIG. 1). Based on model parameters of an adaptation speech model sequence thus selected, linear transformation is performed so as to maximize the likelihood (step S8 in FIG. 1).

In effect, according to the present invention, a single-tree-structure noise-added speech model space is generated into which noise and SNR are integrated, instead of tree-structure noise-added speech model spaces for individual SNRs. Consequently, Noisy speech with varying SNR can be readily dealt with and the computation cost can be saved.

The noise-added speech is used not only in the model learning process but also in clustering. Because noise-added speech is consistently used both in clustering and model learning, the most likely noise-added speech model can be learned. As a result, a higher accuracy of recognition can be achieved.

EXAMPLE

The inventor examined effects of recognition of noisy dialog speech that was performed by the present system. An example of the experiments will be described below.

A speech HMM used in the experiments is a shared-state, speaker-independent context-dependent phoneme HMM produced by using tree-based clustering. A total of 25 dimensions are used as feather quantities: MFCC (Mel Frequency Cepstral Coefficients) 12 and the first derivative of log power. A "mel frequency" is a value based on the sensitivity of the human ear and often used for representing the level of audibility of a sound. MFCC is generated as follows: discrete Fourier transform is applied to acoustic wave data and the resulting value is transformed into its logarithmic expression. Then inverse discrete Fourier transform is applied to the logarithm to produced a waveform, which is sampled at predetermined intervals. The sampled value is MFCC.

Figure 5:
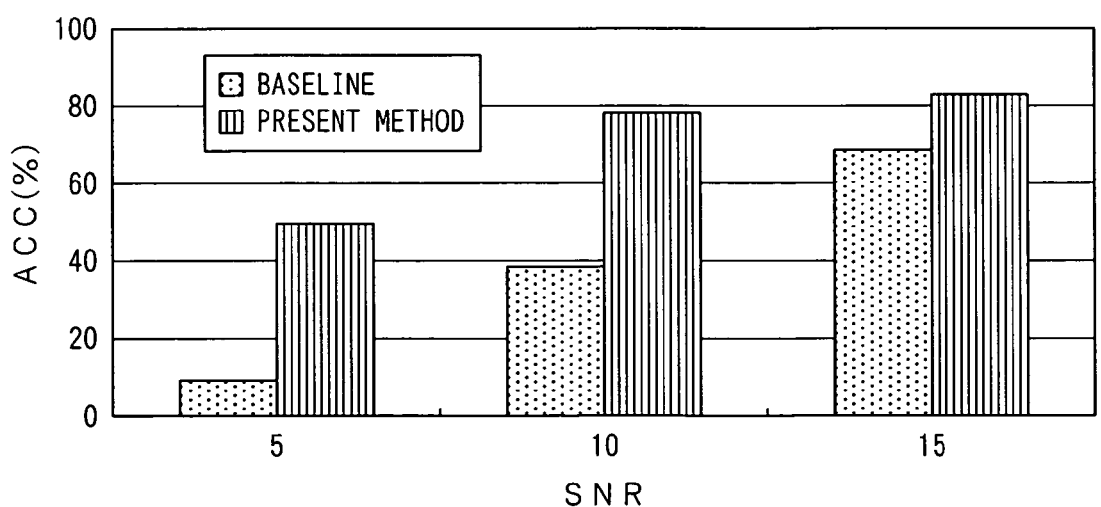
FIG. 5 shows a word accuracy achieved by using a speech HMM adapted by the system.

Effects of the present system will be described below with reference to FIG. 5. FIG. 5 shows a word accuracy (baseline) achieved by using a given speech HMM and a word accuracy (of the inventive method) achieved by using a speech HMM adapted by the system of the present invention. The vertical axis in FIG. 5 represents the word accuracy (%) and the horizontal axis represents SNR (dB). Indicated on the horizontal axis are SNRs of 5, 10, and 15 dB. The half-tone dot meshing bars in FIG. 5 represent the baseline accuracies and the striped bars represent the accuracies of the present system.

It can be seen from the results shown in FIG. 5 that the method according to the present invention is more effective than the conventional method. in this example, the word error rate of the present system is lower than the baseline by 56%. that is, the present invention can provide an improved speech recognition accuracy.

(Speech Model Noise Adaptation Method)

The following noise adaptation method is implemented in the noise adaptation system described above. The method is a noise adaptation method for adapting a speech model for any noise that has been learned by using nose data stored in a noise database and clean speech data to speech to be recognized in a noisy environment. The method comprises a clustering step (corresponding to steps S1 to S4 in FIG. 1) of clustering all pieces of noise-added speech data stored in the noise database; a speech model space generating step (corresponding to step S5 in FIG. 1) of generating a single-tree-structure noisy speech model space on the basis of the result of clustering at the clustering step; a parameter extracting step (corresponding to step S6 in FIG. 1) of extracting a speech feature parameter of input noisy speech to be recognized; a selecting step (corresponding to step S7 in FIG. 1) of selecting an optimum model from the tree-structure noisy speech model space generated at the speech model space generating step; and a linear transformation step (corresponding to step S8 in FIG. 1) of applying linear transformation to the model selected at the selecting step so as to provide a further improved likelihood.

Noisy speech with varying SNR can be readily dealt with and the computation cost can be saved by performing this method and using the single-tree-structure noisy speech model space for speech recognition.

(Noise Adaptation Program of Speech Model)

A program for performing the process shown in FIG. 1 can be provided and used to control a computer to provide the same effects as those described above. The program is a noise adaptation program for speech recognition that controls a computer to adapt a speech model for any noise that has been learned by using all pieces of noise data stored in a noise database and clean speech data to speech to be recognized in a noisy environment. The program comprises a clustering step (corresponding to steps S1 to S4 in FIG. 1) of clustering all pieces of noise-added speech data stored in the noise data base; a speech model space generating step (corresponding to step S5 in FIG. 1) of generating a single-tree-structure noisy speech model space on the basis of the result of clustering at the clustering step; a parameter extracting step (corresponding to step S6 in FIG. 1) of extracting a speech feature parameter of input noisy speech to be recognized; a selecting step (corresponding to step S7 in FIG. 1) of selecting an optimum model from the tree-structure noisy speech model space generated at the speech model space generating step; and a linear transformation step (corresponding to step S8 in FIG. 1) of applying linear transformation to the model selected at the selecting step so as to provide a further improved likelihood.

Noisy speech with varying SNR can be readily dealt with and the computation cost can be saved by executing this program on a computer and using the single-tree-structure noisy speech model space for speech recognition.

A storage medium for storing the program may be a semiconductor memory, a magnetic disk, an optical disk, or any of other storage media, which are not shown in FIG. 1.

Automatic speech recognition systems in general can function well under laboratory conditions but their performances drop in real applications. One problem in real-world applications is reduction in performance of recognition of speech containing noise or music in the background. The present invention can solve this noise problem and improve the accuracy of recognition of noise-added speech.

What is claimed is:

1. A noise adaptation system of speech model for adapting a speech model for any noise to speech to be recognized in a noisy environment, said speech model being learned by using noise data stored in a noise database and clean speech data, said system comprising:

clustering means for clustering all noise data stored in said noise database into a single-tree-structure based on a signal-to-noise ratio condition, where signal-to-noise ratio is a power ratio between the speech and the noise;

speech model space generating means for generating a single-tree-structure noisy speech model space by partitioning a noise-added speech space according to the signal-to-noise ratio and a noise characteristic, based on the result of the clustering performed by said clustering means;

parameter extracting means for extracting a speech feature parameter of input noisy speech to be recognized;

selecting means for selecting an optimum model from the tree-structure noisy speech model space generated by said speech model space generating means; and linear transformation means for applying linear transformation to the model selected by the selecting means so that the model provides a further increased likelihood.

2. The noise adaptation system of speech model according to claim 1, wherein said clustering means generates a noise-added speech by adding said noise to said speech in accordance with the signal-to-noise ratio condition, subtracts the mean value of speech cepstral of the generated noise-added speech, generates a Gaussian distribution model of each of pieces of the generated noise-added speech, and calculates the likelihood between the pieces of the noise-added speech to generate a likelihood matrix to provide a clustering result.

3. The noise adaptation system according to claim 1 or 2, wherein said selecting means selects a model that provides the highest likelihood for the speech feature parameter extracted by said parameter extracting means.

4. The noise adaptation system according to claim 3, wherein said selecting means selects a model by searching said tree-structure noisy speech model space downward from the highest level to the lowest level.

5. The noise adaptation system according to claim 1, wherein said linear transformation means performs the linear transformation on the basis of the model selected by said selecting means to increase the likelihood.

6. A noise adaptation method of speech model for adapting a speech model for any noise to speech to be recognized in a noisy environment, said speech model being learned by using noise data stored in a noise database and clean speech data, said method comprising:

clustering all noise-added speech data stored in said noise database into a single-tree-structure based on a signal-to-noise ratio condition, where signal-to-noise ratio is a power ratio between the speech and the noise;

generating a single-tree-structure noisy speech model space by partitioning a noise-added speech space according to the signal-to-noise ratio and a noise characteristic, based on the result of the clustering performed in said clustering step;

extracting a speech feature parameter of input noisy speech to be recognized;

selecting an optimum model from the tree-structure noisy speech model space generated in said speech model space generating step; and applying linear transformation to the model selected in the selecting step so that the model provides a further increased likelihood.

7. A noise adaptation program for speech recognition for adapting a speech model for any noise to speech to be recognized in a noisy environment, said speech model being learned by using noise data stored in a noise database and clean speech data, said program comprising:

a clustering step of clustering all noise-added speech data stored in said noise database into a single-tree-structure based on a signal-to-noise ratio condition, where signal-to-noise ratio is a power ratio between the speech and the noise;

a speech model space generating step of generating a single-tree-structure noisy speech model space by partitioning a noise-added speech space according to the signal-to-noise ratio and a noise characteristic, based on the result of the clustering performed in said clustering step;

a parameter extracting step of extracting a speech feature parameter of input noisy speech to be recognized;

a selecting step of selecting an optimum model from the tree-structure noisy speech model space generated in said speech model space generating step; and a linear transformation step of applying linear transformation to the model selected in the selecting step so that the model provides a further increased likelihood.

* * * * *